(12) United States Patent
Monnier

(10) Patent No.: US 6,640,749 B1
(45) Date of Patent: Nov. 4, 2003

(54) METHOD AND DEVICE FOR PACKAGING, TRANSPORTING AND ACCLIMATIZATION OF EXOTIC FISH OR AQUATIC PLANTS

(75) Inventor: Laurent Monnier, Reims (FR)

(73) Assignee: Les Serres Aquatiques Sarl, Bethany (FR)

( * ) Notice: Subject to any disclaimer, the term of this patent is extended or adjusted under 35 U.S.C. 154(b) by 0 days.

(21) Appl. No.: 09/889,706
(22) PCT Filed: Jan. 28, 2000
(86) PCT No.: PCT/FR00/00213
§ 371 (c)(1), (2), (4) Date: Jul. 19, 2001
(87) PCT Pub. No.: WO00/45632
PCT Pub. Date: Aug. 10, 2000

(30) Foreign Application Priority Data

Feb. 3, 1999 (FR) .............................................. 99 01335

(51) Int. Cl.[7] .............................................. A01K 63/02
(52) U.S. Cl. ...................................... 119/203; 119/201
(58) Field of Search ............................... 119/201, 214, 119/224, 202, 203, 419, 496, 498, 245, 246, 251, 226, 252, 228, 247

(56) References Cited

U.S. PATENT DOCUMENTS

| 2,652,807 | A | * | 9/1953 | Washburn | 119/203 |
|---|---|---|---|---|---|
| 3,076,432 | A | * | 2/1963 | Jung et al. | 119/203 |
| 3,491,722 | A | | 1/1970 | Levitov Leo et al. | |
| 3,757,739 | A | * | 9/1973 | Whitener | 119/261 |
| 4,040,200 | A | | 8/1977 | Tomita | |
| 4,188,909 | A | | 2/1980 | Spivak | |
| 4,787,872 | A | * | 11/1988 | Bajo | 446/5 |
| 5,117,777 | A | * | 6/1992 | Takasugi | 119/203 |
| 5,165,361 | A | | 11/1992 | Beghini | |
| 5,309,868 | A | * | 5/1994 | Tomiyama | 119/203 |
| 5,606,935 | A | * | 3/1997 | Hanrahan | 119/203 |
| 5,722,345 | A | * | 3/1998 | Nagaura | 119/203 |
| 6,067,937 | A | * | 5/2000 | Boschert | 119/247 |
| 6,125,791 | A | * | 10/2000 | Gundersen et al. | 119/228 |

FOREIGN PATENT DOCUMENTS

| FR | 2755432 | | 11/1996 |
|---|---|---|---|
| JP | 1296929 | * | 11/1989 |
| JP | 6121631 | * | 5/1994 |

* cited by examiner

Primary Examiner—Peter M. Poon
Assistant Examiner—David J Parsley
(74) Attorney, Agent, or Firm—Pearne &Gordon LLP

(57) ABSTRACT

A process for preparing, transporting and acclimatizing exotic fish or aquatic plants, employing a tank of rigid plastic material and a transparent plastic foil, includes: prefilling the tank with water to between 50% and 80% of capacity; placing the fish or plants in the tank; purging the tank of air; sealing the tank with the foil; transporting the fish or aquatic plants; leveling the tank; punching two apertures in the foil; introducing water from an aquarium drop-by-drop into the first aperture; removing any excess water from the tank via the second aperture; after an acclimatization period, removing the foil from the tank; and transferring the fish or plants to the aquarium.

6 Claims, 3 Drawing Sheets

METHOD AND DEVICE FOR PACKAGING, TRANSPORTING AND ACCLIMATIZATION OF EXOTIC FISH OR AQUATIC PLANTS

BACKGROUND OF THE INVENTION

1. Field of the Invention

This invention relates to a process and a device for preparing, shipping and acclimatizing exotic fish or aquatic plants.

For more than 60 years, live exotic fish have been shipped in soft plastic bags, at the risk of leaks through punctures or of killing the fish by squashing the corners. This has led to more than negligible losses during transport. Besides, because of their flexible nature, these plastic bags do not lend themselves to a progressive acclimatization of the fish prior to their transfer into the aquarium in which they are to live. Then, too, the water chemistry in these bags usually differs considerably from that in an aquarium especially with respect to the nitrate and ammonium pH level, resulting in a sometimes significant mortality rate in the weeks following the transfer of the fish into the aquarium, a particularly undesirable fact given that some exotic fish are quite rare and often rather expensive.

The same problem is encountered with exotic aquatic plants intended for seascaping the aquariums.

2. Description of the Prior Art

Prior art already offers various techniques and means, described in the following documents and designed to keep living marine organisms and especially molluscs alive during transport:

U.S. Pat. No. 5,165,361,A describes a process and a device for preparing bivalvular molluscs and keeping them alive outside their natural habitat, assuring their marketability without posing a hazard to the consumer. The device which is intended to meet these requirements consists of a small, rigid, transparent tank which can be closed off with a rigid, transparent lid that fits over the rim of the tank and is equipped with a valve through which a suitable gas mixture can be introduced after the extraction of air enclosures trapped during the closing process, preceded by the insertion of the molluscs and their preservative liquid. Such a device, if indeed it is suitable for shipping live fish and aquatic plants, does not permit effective initial preparation and, even less so, an appropriate acclimatization process, the only guarantee for keeping organisms thus shipped alive and ultimately thriving in an aquarium.

The French patent 2,755,432. A describes a conditioning process for live aquatic animals, using a tank filled with water and air and closed off air-tight by a lid, which tank distinguishes itself from similar devices primarily by the particular shape of the bottom and the walls which makes allowances for the shape of the aquatic animals in question, in this case strictly bivalvular shell-fish and especially oysters, which can be arranged in a single layer without the risk of upending or piling them by repeated handling during transport. In this case as well, the inventor has the same concerns as in connection with the example discussed above.

The U.S. Pat. No. 4,040,200. A relates to a container that constitutes a sort of portable fish pond essentially intended for keeping alive and well such fish as can be used for angling or for restocking. The reusable lid is therefore factory-supplied with two plug-equipped bung holes through which the water can be oxygenated while at the same time air trapped between the surface of the water and the lid can be siphoned off by means of a device mounted on the outside wall of the container. Large-diameter piping is provided at the bottom of the container, allowing all or part of the content to be emptied out after removal of a plug in the lid.

As is evident, none of the processes and devices described in the documents briefly discussed above, whether by themselves or in any combination, provide for the preparation or conditioning and shipping of the live aquatic organisms in question and much less for the progressive acclimatization of delicate exotic fish or plants that are to stay alive in an aquarium under totally artificial conditions, considering that these fish and plants are quite expensive and that even the slightest loss during the transport or acclimatization has a negative effect on the profitability of the business concerned, whether or not it is aimed at aquariophiles or at pisciculture.

SUMMARY OF THE INVENTION

It is the objective of this invention to remedy these shortcomings. The invention as specified solves the problem by defining a process and providing a device for the preparation, shipping and acclimatization of exotic fish or exotic aquatic plants, reducing losses during shipping to an absolute minimum or in fact to zero while also permitting an acclimatization to a new aquachemical environment in the aquarium under ideal conditions before the fish or aquatic plants in question are transferred into the target aquariums.

The process for preparing, transporting and acclimatizing exotic fish or aquatic plants, employing a tank of a rigid plastic material and a transparent plastic foil for hermetically sealing the said tank after partially filling it with water containing the fish or plants, with the possible addition of a gas, is characterized in that:

A- The preparation is performed along the following steps:
  a) The fish or plants to be shipped are placed in the water with which the tank is first filled up to 50% or, respectively, 80% of its capacity;
  b) The tank is purged of air and, possibly after the introduction of a gas, is then sealed with the plastic foil.

B. The acclimatization involves the following steps:
  After levelling the tank, two perforations are punched into the plastic foil that seals the tank;
  Water taken from the receiving aquarium is introduced drop by drop;
  The drop-by-drop introduction is continued for a specific length of time after excess water has been removed through the second perforation;
  The plastic foil is removed;
  The fish or plants are transferred into the aquarium.

The device used for applying the process per this invention, employing a tank of a rigid plastic material and a transparent plastic foil ensuring the hermetic sealing of the said tank after it has been partially filled, is characterized primarily in that the plastic foil is provided with markings for the location of the two perforations to be punched into the foil for the acclimatization phase, that the acclimatization device consists of flexible tubing one end of which is connected to an immersion tube inserted in the water of the aquarium while its other end extends via a valve through one of the perforations previously punched into the plastic foil and into the inside of the tank.

Several tanks containing fish and/or plants for the same aquarium can be acclimatized together by means of shared tubing, connected to an immersion tube via a coupling and to a manifold that connects to each of the tanks via individual hoses and valves.

The flow of the water from the aquarium to each tank takes place by gravity, for which each tank is placed below the water level of the aquarium.

The advantages made possible by this invention consist essentially in the ability to fully automate the preparation process, to render the shipping process cost-effective allowing for transit times of up to six days for fish and four weeks for aquatic plants, and to greatly simplify the acclimatization process, with the use of the tank itself as shipping container giving the organisms involved the best chance of survival.

Other characteristic features and advantages will be evident from the following description of a device per this invention, used for transporting exotic fish from their point of origin to the marketplace, given as a nonlimiting example with reference to the attached drawings in which:

DESCRIPTION OF THE PREFERRED EMBODIMENTS

Figure 1:
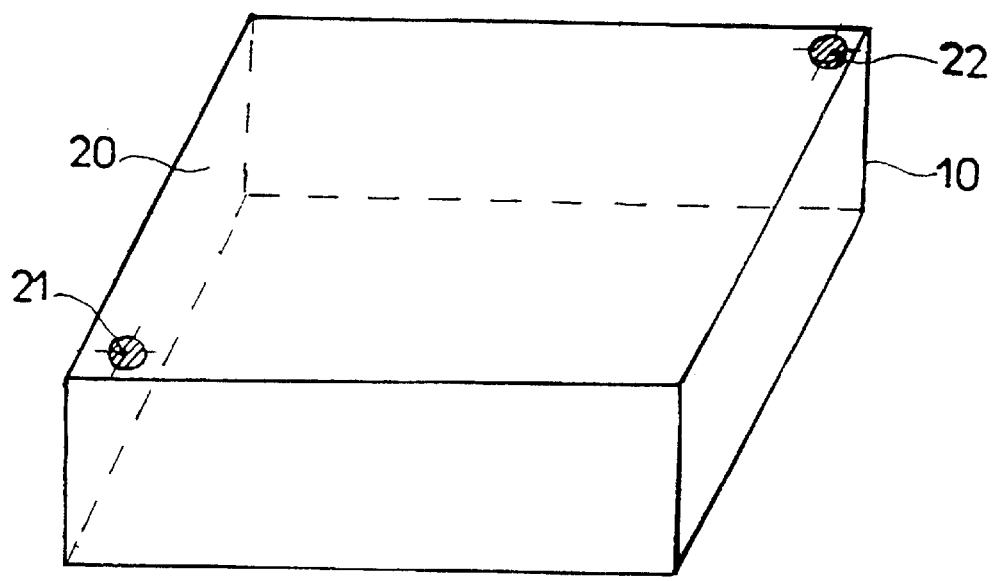
FIG. 1 is a schematic perspective view of a tank sealed by a plastic foil.

The drawings illustrate a device for preparing, transporting and acclimating exotic fish, designed according to this invention and principally encompassing tanks 10, sealable by means of a transparent foil 20 with markings indicating the location of acclimatization perforations 21, 22, and flexible tubes 30, 31, 32, 33 mutually connected by a manifold 34 and connected to an immersion tube 35 via a coupling 36 and to the tanks 10, 11, 12 via drip valves 37 whose tip extends through one of the acclimatization perforations 21, 22; with a hook 38 holding the coupling 36 of the immersion tube 35 in place on the rim of the aquarium 1.

Figure 2:
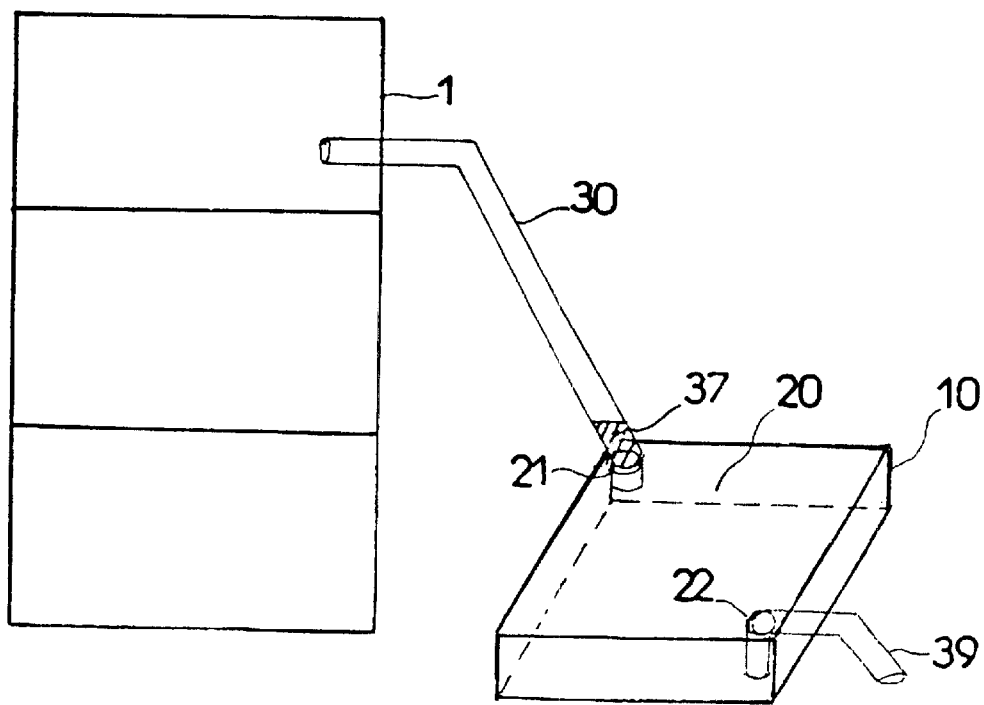
FIG. 2 is a schematic perspective view of an acclimatization device in operation.

A closer look at the details in FIGS. 1 and 2 shows how the tanks 10 are filled with water up to approximately half their capacity, exotic fish are introduced for shipping, the tanks are purged of any air, a gas may be injected, and the tanks are sealed with a transparent foil 20 which in addition to the markings 23 pertaining to final acclimatization is marked with the location of the acclimatization perforations 21 and 22 to be punched into it respectively for the insertion of the drip valve 37 into the tank 10 and for the removal of excess water as indicated in FIG. 2 which shows a tank 10 connected to an aquarium 1 via a tube 30 equipped with a drip valve 37 and with provisions for the removal of excess water via a tube 39.

Figure 3:
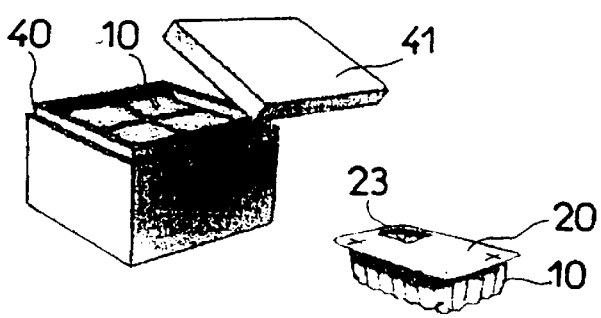
FIG. 3 is a perspective view of a full tank and of the collective shipping crate with the lid removed.

Successively continuing with the examination of FIGS. 3 to 8 which show the sequence of events in the acclimatization phase of the process per this invention, it will be readily evident from FIG. 3 that the tanks 10 are grouped in crates 40 with polystyrene lids 41 and are arranged in a multi-level quincunx.

Figure 4:
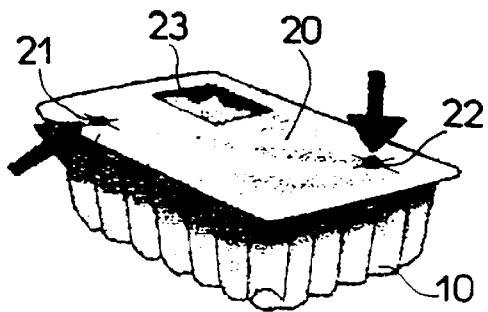
FIG. 4 is a perspective view of a full tank, with the plastic foil marked for the perforations to be punched.

FIG. 4 shows a full tank 10 that has been removed from its shipping crate 40 and into whose plastic foil 20 the perforations 21 and 22 have been punched at the marked locations as per the instructions 23 on the foil 20.

Figure 5:
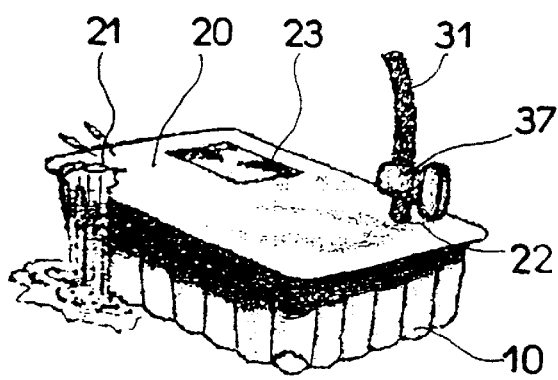
FIG. 5 is a perspective view of a full tank during the acclimatization process.

FIG. 5 shows a tank 10 during the acclimatization of the fish it contains by the drop-by-drop gravity-fed transfer of aquarium water until the water in the tank 10 runs over through the prepunched overflow perforation 21, with the acclimatization process taking about one hour.

Figure 6:
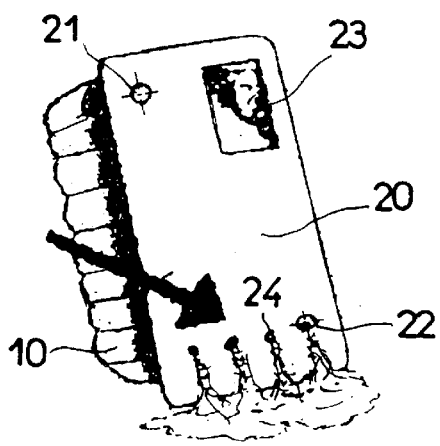
FIG. 6 is a perspective view of a full tank as the water it contains is partially drained after the acclimatization, and showing the perforations punched in the plastic foil.

FIG. 6 shows the partial draining of the water contained in the tank 10 by tilting the side of the overflow perforation 22 after auxiliary perforations 24 have been punched on the same level parallel to the corresponding narrow side of the tank 10.

Figure 7:
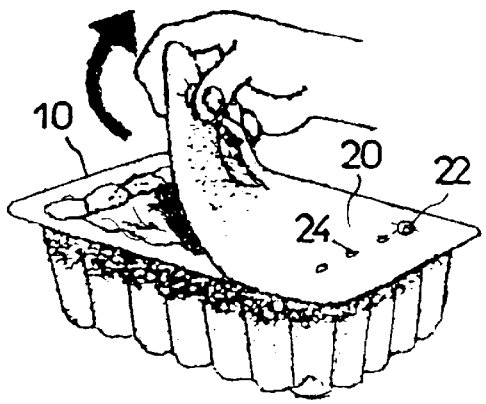
FIG. 7 is a perspective view of a partially emptied tank in its open position.

FIG. 7 shows how after the removal of about 50% of the water contained in the tank by the process indicated in FIG. 6, the sealing foil 20 is progressively loosened and removed.

Figure 8:
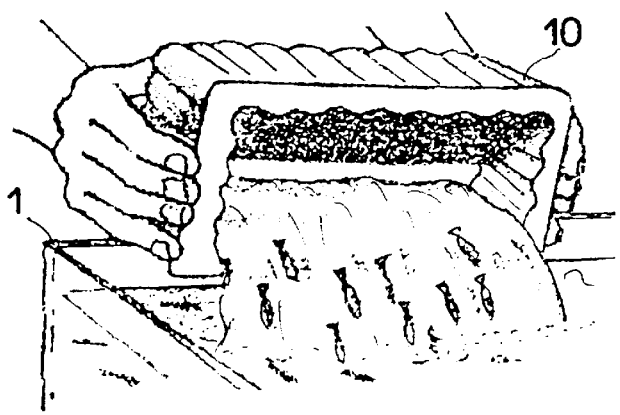
FIG. 8 shows a tank as its contents are transferred into an aquarium.

FIG. 8 illustrates the transfer of the water and the fish, after the acclimatization, from the tank 10 into the aquarium by a simple lateral pouring operation.

Figure 9:
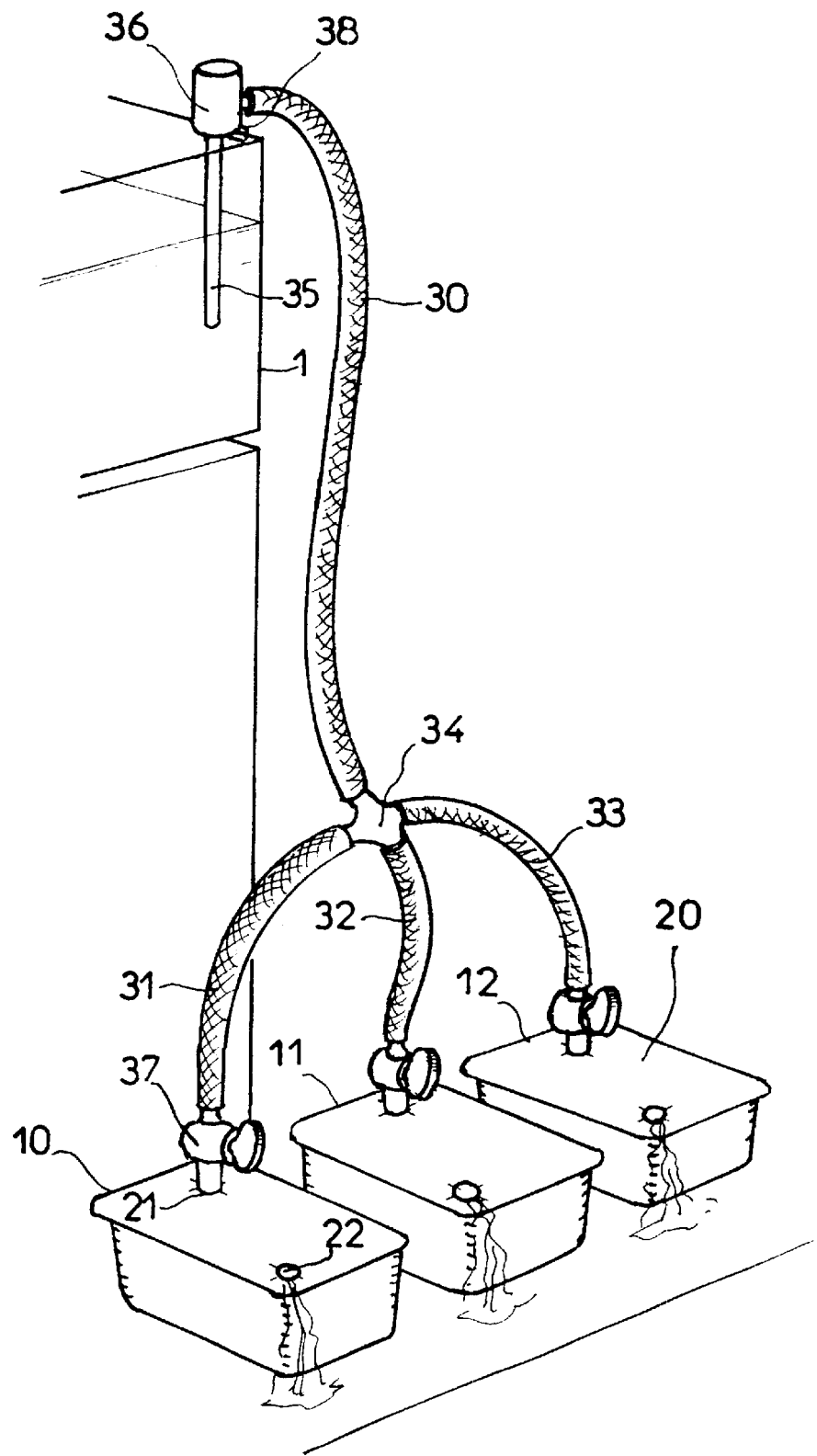
FIG. 9 is a perspective front view of a triple-station acclimatization system.

Referring to FIG. 9, showing in detail a collective acclimatization installation, it can be seen how perforations 21 and 22 of several tanks 10, 11, 12 are punched employing the procedure per FIG. 4, followed by the insertion of the tips of the corresponding drip valves 37 located at the free end of the individual tubes 31, 32, 33 which are connected via a manifold 34 and a common tube 30 to a coupling 36 attached to the rim of the target aquarium 1 with a hook 38 and extended toward the bottom of the aquarium 1 by an immersion tube 35 whose end is situated below the water level which, after the tanks 10, 11 and 12 have been placed below the water level of the aquarium, is enough to obtain a drop-by-drop, gravity-fed flow by way of the valves 37 in order to achieve for the fish a progressive, complete replenishment of the water content in the tanks within a span of about one hour. Upon completion of this operation the fish are transferred into the aquarium along the procedure shown in FIGS. 6 to 8.

As far as exotic aquatic plants are concerned, these have until now been shipped in a very simple manner, wrapped in moist newspapers or in plastic bags laid out in cardboard boxes that have been used as shipping containers. Upon arrival at their destination they have been unpacked and subjected to acclimatization in the water of the aquatic planters.

Using the process and the device per this invention, the plants are prepared in tanks without water but with a precisely calibrated ambient humidity, the tanks are purged of air, followed by the injection of a specific gas that facilitates preservation during transit, and air-tight sealing with a plastic foil along the procedure shown in FIG. 3 to 7, with the operation per FIG. 8 replaced by a direct transplantation into the aquarium.

The aquatic plants thus prepared will remain preserved for two to three weeks which allows them to be taken directly to market in their original prepared state and to be acclimatized by the drip method according to this invention immediately prior to their planting in the aquarium.

In practice, the preparation of the fish involves the following procedural steps:

1) For most species
  a) Use of 50% of old or new water at the proper temperature,
  b) Air removal from the container, followed by the injection of oxygen in a quantity precisely measured and regulated so as not to harm the fish,
  c) Admixture of the correct dose of a special ammonium-inhibiting substance,
  d) Admixture of the correct dose of a special anti-stress substance,
  e) Use of a special barrier foil or film for sealing the tank. This foil is provided in rolls, premarked for the acclimatization perforations and featuring a four-color strip indicating the sequence of the acclimatization operations as illustrated in FIG. 4 to 8.

2) For certain species (labyrinthidae) the preparation is performed without the evacuation of air and hence without the injection of oxygen.

For shipping purposes, sixteen tanks can be accommodated in one polystyrene container as shown in FIG. 3, in contrast to the old preparation method by which a given container would hold only five plastic bags each containing the same number of fish as a tank according to this invention, and only light-weight at that. It follows that within the same weight limits three times as many fish can be transported. On arrival, as shown in FIG. 3, the crates 40 are opened by the removal of their lids 41 and the tanks are taken out, with an immediate visual inspection to verify the state of health of the fish which are then set up for acclimatization.

The process and the device per this invention, while specifically developed for transporting and acclimatizing fish and aquatic plants for aquariums, may be equally employed, with minor adaptations without departing from the substance of this invention, for the preparation and shipping and in certain cases even the acclimatization of other species of animals and plants where a particular humidity level or water must be maintained during shipping (reptiles, batrachians etc.).

What is claimed is:

1. A process for preparing, transporting and acclimatizing exotic fish or aquatic plants, employing a tank of rigid plastic material and a transparent plastic foil, said process comprising:

preparing said fish or plants, including the following steps:
    prefilling said tank with water to between 50% and 80% of said tank's capacity;
    placing said fish or plants in said tank;
    purging said tank of air;
    sealing said tank with said foil; and
  transporting said fish or aquatic plants; and
  acclimatizing said fish or aquatic plants, including the following steps:
    leveling said tank;
    punching two apertures in said foil;
    introducing water from an aquarium drop-by-drop into a first of said two apertures;
    removing excess water from said tank via a second of said apertures;
    after an acclimatization period, removing said foil from said tank; and
    transferring said fish or plants to said aquarium.

2. A process according to claim 1, further comprising injecting a gas into said tank during said preparing step.

3. A device for applying the process of claim 1, said device comprising:
  a rigid plastic tank having a top aperture; and
  a plastic foil adapted to seal said top aperture, wherein said foil is provided with markings indicating locations for piercing a water inlet aperture and a water outlet aperture into said foil, said inlet aperture and outlet aperture each to be produced by puncturing said foil; and
  a tube having one end adapted to be immersed in an aquarium and another end adapted to be inserted in said inlet aperture to introduce water therein to provide acclimatization of said tank, said tube including a valve.

4. A device according to claim 3, characterized in that an outflow of water from the aquarium toward the tank takes place by gravity, for which said tank is placed beneath a water level of the aquarium.

5. A device for applying the process of claim 1, said device comprising:
  a plurality of rigid plastic tanks each having a top aperture and a plastic foil adapted to seal said top aperture, each said foil being provided with markings indicating locations for a water inlet aperture and a water outlet aperture, said inlet aperture and outlet aperture each to be produced by puncturing said foil;
  a manifold;
  a first tube having one end adapted to be immersed in an aquarium and a second end communicating with said manifold;
  a plurality of second tubes, each second tube including a valve and having one end communicating with said manifold and another end adapted to be inserted in said inlet aperture of a respective foil of said plurality of tanks to introduce water therein, said device permitting concurrent acclimatization of said tanks.

6. A device according to claim 5, characterized in that an outflow of water from the aquarium toward each tank takes place by gravity, for which each tank is placed beneath a water level of the aquarium.

* * * * *

UNITED STATES PATENT AND TRADEMARK OFFICE
CERTIFICATE OF CORRECTION

PATENT NO. : 6,640,749 B1
DATED : November 4, 2003
INVENTOR(S) : Laurent Monnier It is certified that error appears in the above-identified patent and that said Letters Patent is hereby corrected as shown below:

Title page, Item [54] and Column 1, lines 1-3,
Please delete "METHOD AND DEVICE FOR PACKAGING, TRANSPORTING AND ACCLIMATIZATION OF EXOTIC FISH OR AQUATIC PLANTS", and insert therefor -- METHOD AND DEVICE FOR PACKAGING, TRANSPORTING AND ACCLIMATISATION OF EXOTIC FISH OR AQUATIC PLANTS --.

Title page,
Item [73], Assignee, please delete "Bethany", and insert therefor -- Betheny --.

Column 1,
Line 32, please delete "U.S. Pat. No. 5,165,361,A", and insert therefor -- U.S. Pat. No. 5,165,361.A --.
Line 48, please delete "The French patent 2,755,432. A", and insert therefor -- The French patent 2,755,432.A --.
Line 60, please delete "The U.S. Pat. No. 4,040,200. A" and insert therefor -- The U.S. Pat. No. 4,040,200.A --.

Signed and Sealed this

Twenty-seventh Day of April, 2004

JON W. DUDAS
*Acting Director of the United States Patent and Trademark Office*